Sept. 11, 1962     M. V. BRAUNAGEL     3,053,091

MULTIPLE THERMOCOUPLE CIRCUIT

Filed Oct. 26, 1954

INVENTOR
Magnus V. Braunagel
BY
Paul Fitzpatrick
ATTORNEY

United States Patent Office 3,053,091
Patented Sept. 11, 1962

3,053,091
MULTIPLE THERMOCOUPLE CIRCUIT
Magnus V. Braunagel, Indianapolis, Ind., assignor to General Motors Corporation, Detroit, Mich., a corporation of Delaware
Filed Oct. 26, 1954, Ser. No. 464,780
11 Claims. (Cl. 73—341)

My invention relates to systems for obtaining an accurate composite or average indication of a plurality of values of similar nature. The invention was conceived as a solution to the problem of obtaining an accurate mean reading from a number of thermocouples connected to a common responsive device and will be described principally in connection with this embodiment of the invention, but, as will be apparent, it is capable of more general application.

A note as to the problems involved in usual thermocouple circuits may clarify the nature and significance of the invention. Multiple thermo-couples are frequently used in installations such as large ducts through which hot gas flows, and in which the temperature of the gas may not be entirely uniform at all points, connected to obtain a single reading or interpretation of temperature which will fairly represent the average temperature of the gas. In the past, it has been considered necessary to have all the thermocouples connected to the responsive device or meter through leads of equal resistance in order that each will have the same influence on the meter. (The term "meter" will be used hereinafter for any indicating, recording, or controlling device which responds to the voltage or current generated by the thermocouples or other sensitive device.)

In order to have the resistances of all the leads equal, it has been customary to use a "common end point" type harness in which leads of equal resistance are brought from all the thermocouples to a common junction box or breakout point from which they are connected to the meter. While this is simple electrically, a bulky and cumbersome harness with wires running from the common junction to each thermocouple is required. It is usually most practicable in a common end point harness to have all the leads of equal length, so that the excess length of the leads to the nearer thermocouples increases the clumsiness of the harness. Also, because of the numerous long leads, the weight of harness is undesirably great and, in practice, to reduce the weight, braided harness is necessary with its attendant unreliability and susceptibility to damage from heat and handling. Also, with high temperature thermocouples, these long leads must be made of critical material containing alloys which form the thermocouple electrodes, such as Alumel and Chromel.

Because of the numerous disadvantages of this type of installation, there have also been proposals to connect a number of thermocouples in a ladder configuration, that is, with all the thermocouples connected in parallel to bus bars, which may be relatively heavy, the approach in this case being to minimize the resistance between the thermocouples and the meter so that the inequalities of resistance will be less significant. This method does not give good averaging and, of course, results in waste of strategic materials in Chromel and Alumel bus bars as well as involving unnecessary weight.

Also, in connection with parallel installations, it has been proposed to put a substantial resistance in series with each thermocouple or other responsive device in its branch circuit so that the resistances of the branches are equal and are much higher than the resistance of the busses by which they are connected in parallel to the meter. This, of course, reduces the sensitivity of the entire installation. It merely improves the balance between the thermocouples at the expense of accuracy and sensitivity of the overall system.

My invention is based upon the discovery that accurate equalization of a number of thermocouples can be achieved with a parallel or ladder type harness by the provision of unequal resistances in the branch circuits, of magnitudes based upon the principle which will be explained hereinafter. By virtue of the invention, the simple parallel, ladder or bus bar type harness may be used; it being understood, however, that the bus bars need not be heavy, since it is not necessary to minimize the resistance of the common conductor. Thus, the disadvantages of both the common end point installation and the conventional bus bar installation are eliminated. By virtue of the invention, accurate equalization of the effects of all the thermocouples on the meter may be achieved by a simple resistance loading of the branch circuits. As a result, an accurate, reliable, neat, and rugged installation is possible which requires much less strategic material and is lighter than previous harnesses.

The principal objects of the invention are to provide improved systems for response to a condition at a plurality of points and particularly thermocouple systems of this character; to provide an improved multiple thermocouple installation; and to provide an accurately balanced parallel thermocouple installation. The nature of the invention and the advantages thereof will be more clearly apparent from the succeeding description and the accompanying drawings, in which:

FIGURE 5 is a schematic illustration of a number of thermocouples in a large gas duct or the like.

Figure 5:
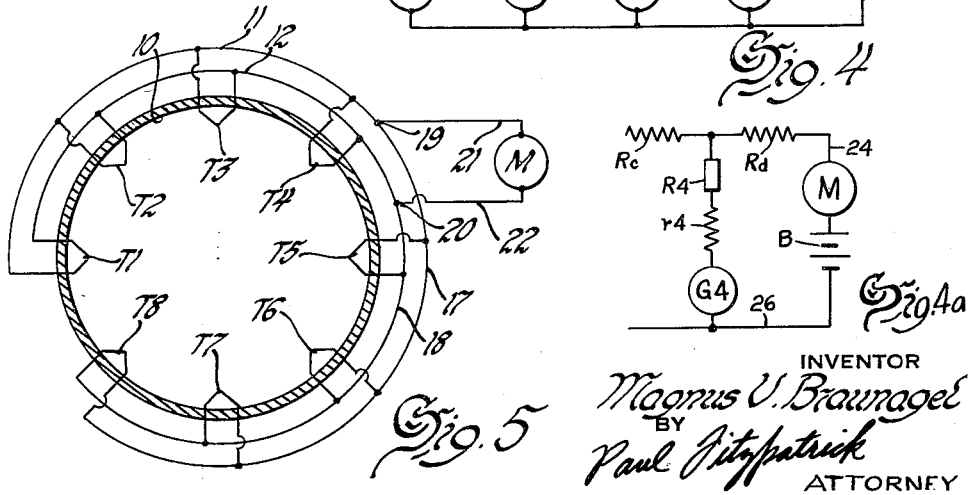

It may be best to refer first to FIGURE 5 to indicate the magnitude of the problem involved. FIGURE 5 illustrates, in a view along the axis thereof, a duct 10 which may convey gas at high temperature and which may be as much as a yard in diameter. As illustrated, eight thermocouples T1 to T8 are mounted in a ring around the periphery of the duct 10 with their junctions in the gas stream, and all these thermocouples are connected in parallel to a meter or other responsive device M. As will be apparent, thermocouples T1 to T4 are in one group connected to the meter by leads or busses 11 and 12 and thermocouples T5 to T8 are in a second group connected to the meter through leads 17 and 18. These leads run to breakout points 19, 20 from which conductors 21 and 22 may be run to the meter. As will be apparent, the effect of the several thermocouples on the meter will be unequal in the absence of some special provision to equalize them, because (to put the matter in general terms) voltage drops in the circuits from the various thermocouples to the meter are not equal.

In the common end point harness referred to above, a separate pair of leads would be run from each thermocouple to the junction points 19, 20. These would be made of equal resistance; as a practical matter, of equal length wires of the same gauge.

Figure 4:
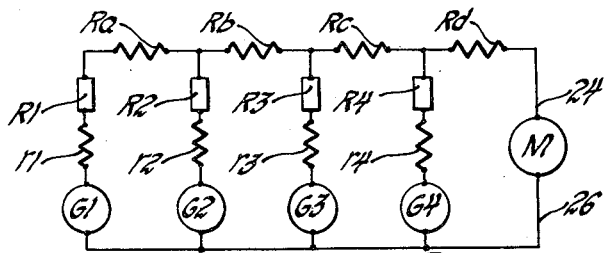
FIGURE 4 is a circuit diagram of an installation illustrating the principles of the invention.

The nature of the means by which the thermocouples are equalized or balanced according to my invention will first be discussed in connection with a general example not specific to thermocouples. FIGURE 4 shows four devices identified as G1, G2, G3, and G4, which generate (or provide in some manner) a potential or current in response to some phenomenon. It will be understood that these devices might be thermocouples or other devices which generate a voltage or current in response to some measureable physical quantity. The internal resistances of the generators G1 to G4 are represented by $r1$, $r2$, $r3$, and $r4$. Resistances included in the circuit for balancing the circuit are indicated by R1, R2, R3, and R4. The resistances of the sections of the bus bar are represented by $Ra$, $Rb$, $Rc$, and $Rd$. For simplicity, the resistances of both bus bars 24 and 26 are shown as being in the upper bus bar 24. In this figure, and in other figures to be described, it will be noted that a zigzag line symbolizes the inherent resistance (or impedance) of a generator or line (such as $r1$ or $Ra$) and a rectangle symbolizes a balancing resistor added to the circuit, such as R1.

The circuit illustrated in FIGURE 4 is balanced by the addition of suitable resistors R1, R2, R3, and R4, one in each branch circuit, although in most cases the resistance R1 in the branch circuit most remote from the meter may be omitted. In other words, R1 may be considered to be zero, so, for the present, we may assume that R1 has any arbitrary value including zero. Then, to balance G2 with G1, R2 plus $r2$ must equal R1 plus $r1$ plus $Ra$. Since all the values in this equation except R2 are known or can be determined by computation from the dimensions and characteristics of the parts, or by measurement, the value of R2 may be readily determined. It will be seen that the resistance in the second branch containing G2 thus equals that in the first branch containing G1 plus the resistance $Ra$ of the section of bus bar leading from the latter to the former. The total resistance in the third branch containing G3 must equal the resistance in the second branch plus twice the resistance $Rb$ of the section of bus bar running from the second to the third branch. Similarly, the resistance in the fourth branch containing G4 must equal the resistance in the third branch plus three times the resistance of the bus bar leading from the third to the fourth branch.

It will be seen, therefore, that the total resistance in each branch is equal to the total resistance in the branch immediately more remote from the meter plus the product of the resistance of the section of bus bar between them by the number of generators more remote from the meter than the one in the branch in question. With the resistances so set up, each generator has a mathematically equal effect on the meter and if the generators have a linear response to the particular condition to which they are sensitive, the meter will indicate a true average of the values of the condition at the locations of the several generators.

In a practical installation, R1 may be zero unless the internal resistance of some generator nearer the meter is so great that loading of the first circuit is required. In most cases, the internal resistances of all the generators will be substantially the same, if they are of similar nature such as would ordinarily be connected in a parallel circuit. Also, $Ra$, $Rb$, $Rc$, and $Rd$ might be equal, but in most cases they would be functions of the lengths of the leads between the various points. The relations of the several resistances may be summarized or tabulated below as follows:

$$R2+r2=R1+r1+Ra$$
$$R3+r3=R2+r2+2Rb$$
$$R4+r4=R3+r3+3Rc$$

While the impedances shown in FIGURE 4 are all indicated by the symbol R, it will be understood that the balancing principle could be applied to an alternating current circuit, in which the impedances might be other than pure resistances, as long as they are suitably balanced to avoid out of phase relation between the circuits.

Figure 1:
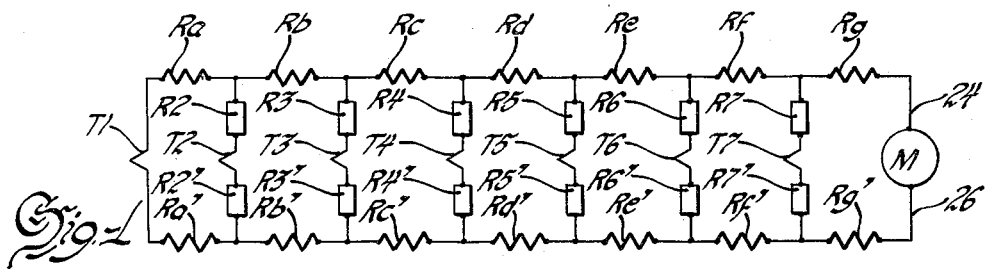
FIGURE 1 is a circuit diagram of a parallel thermocouple arrangement in which all of the thermocouples are in a single group.

FIGURE 1 shows a thermocouple installation embodying the principles illustrated by FIGURE 4. As shown in FIGURE 1, there are seven thermocouples, T1 to T7, in a single group connected to the meter M. Since the thermocouple electrodes are of different material and the leads must be of the same materials as, for example, Alumel and Chromel, and these leads do not have the same temperature coefficients of resistance, it is desirable to load or compensate both the positive and negative leads. In other words, assuming that lead 24 is Alumel and 26 is Chromel, resistors R2 to R7 preferably are coils of Alumel wire and resistors R2' to R7' coils of Chromel wire. These coils compensate for the resistances $Ra$ to $Rf$ and $Ra'$ to $Rf'$ of the sections of bus bar. The term "bus bar" is used for convenience, although the wire need be only heavy enough to give it the desired strength, as, for example, number 14 gauge. As shown in FIGURE 1, there is no balancing resistor R1 for the first branch containing thermocouple T1. Internal resistances of the thermocouples are not shown in the figure, since they are ordinarily substantially equal and if nearly enough equal may be neglected. If unequal, the differences may be absorbed by corresponding variations of the weighting resistors.

Developing the compensating resistances according to the principles of the invention,

| | |
|---|---|
| $R2=Ra$ | $R2'=Ra'$ |
| $R3=R2+2Rb$ | $R3'=R2'+2Rb'$ |
| $R4=R3+3Rc$ | $R4'=R3'+3Rc'$ |
| $R5=R4+4Rd$ | $R5'=R4'+4Rd'$ |
| $R6=R5+5Re$ | $R6'=R5'+5Re'$ |
| $R7=R6+6Rf$ | $R7'=R6'+6Rf'$ |

It should be noted, of course, that the loading of both sides of the branch circuits is a result of the peculiar nature of thermocouple installation and would not be necessary or desirable in many other types of installations. As a physical matter, this loading involves very little since small wire wound resistors may readily be incorporated in the circuit, the length of the wire being computed to give the desired resistance.

The tabulation of the values of the resistances of the branch circuits in the second preceding paragraph may be restated as follows:

$$R2=Ra$$
$$R3=Ra+2Rb$$
$$R4=Ra+2Rb+3Rc$$
$$R5=Ra+2Rb+3Rc+4Rd$$

and so on. This is arrived at by simple substitution in the tabulation above.

Figure 2:
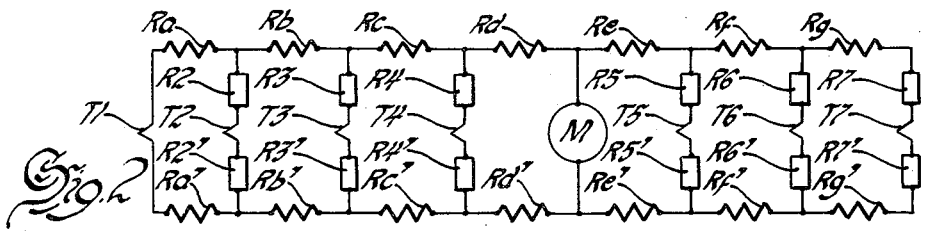
FIGURE 2 is a circuit diagram of an arrangement in which the thermocouples are in two groups.

It will be apparent that any number of identical groups such as that shown in FIGURE 1 could be connected to a single meter with the result that accurate readings would be given. However, it may well be that when more than one group must be connected to a meter they will not be identical, either because the numbers of thermocouples in the groups are unequal, or because the resistance of the leads are unequal. This sort of situation is illustrated by FIGURE 2, in which two groups are connected to a common meter, the thermocouples T1 to T4 shown to the left of the meter constituting a group of four, and the thermocouples T5 to T7 shown to the right of the meter constituting a group of three. By applying the principles of the invention, this sort of installation can also be balanced. In such a situation, it will be found that if each group is compensated as previously described, starting at the thermocouple most remote from the meter and working toward the meter, the two groups will not balance. It will be necessary to refigure the loading of that group which figures to have too heavy an effect on the meter. Ordinarily, this will be the group with the smaller number of thermocouples, although conceivably differences in lengths of leads might give rise to the reverse situation. Similarly, if there are a number of groups connected to a meter, there will be one group which can be loaded exactly as described with respect to FIGURE 1, while all the others must be additionally loaded.

The manner in which this is accomplished will now be explained, first with reference to FIGURE 2 and then with reference to FIGURE 3 which illustrates a different arrangement for the purpose. Since in FIGURE 2 the symbology of the leads connecting the first four thermocouples to the meter is the same as that in FIGURE 1, it will be apparent that the values of R2, R3, R4, R2', R3', and R4' tabulated above will apply also in this case. However, if we start at the right end with T7 and proceed toward the meter in the same way as was done in the left group, the thermocouples T5, T6 and T7 will have an abnormal influence on the meter. In this case, therefore, the computation for the right group proceeds from the meter out and the values of the compensating resistors for the thermocouples of the right group are developed as follows:

If a fifth thermocouple were connected directly to the meter, it would require a balancing resistance equal to $R4+4Rd$ to balance with T1 to T4. This hypothetical thermocouple could be considered as belonging to either group. On this basis, we can work out from the meter to calculate the compensating resistances in the right group, as follows:

$$R5 = R4 + 4Rd - 3Re$$
$$R6 = R5 - 2Rf$$
$$R7 = R6 - Rg$$

The same relation applies, of course, to the Chromel resistors.

It will be noted that the coefficient of the last term of the equation in each case equals the number of thermocouples more remote from the meter than the bus segment the resistance of which is in the term. It will also be noted that the progressive relation of R7, R6, and R5 from the end toward the meter is the same relation as in the left group, but that the resistance added in the most remote branch is not zero, so that the compensating resistors are larger than those in the other group.

Figure 3:
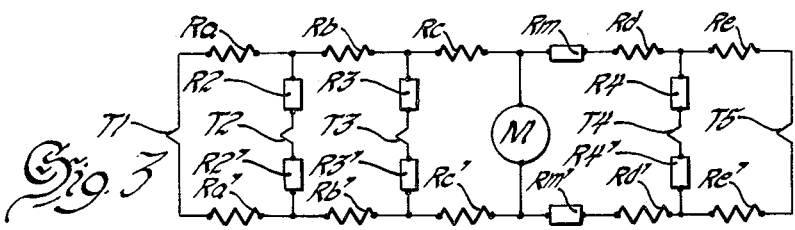
FIGURE 3 is a circuit diagram of a second type of two-group installation in which a different means to equalize the two groups is employed.

FIGURE 3 shows, by way of example, two groups of thermocouples, a first group of three thermocouples, T1 to T3, and a second group of two thermocouples, T4 and T5. In this case, the values of R2, R3 and R4 are computed from the end member of each group toward the center which, as previously stated, would result in an unbalanced condition, but the unbalance is corrected by inclusion of balancing resistors Rm and Rm' adjacent the meter in the busses of the side requiring compensation.

As will be apparent from what has gone before, balancing each group individually, R2 must equal $Ra$
R3 must equal $R2 + 2Rb$, and
R4 must equal $Re$.

The compensating resistor for the hypothetical thermocouple at the meter would $R3 + 3Rc$.
Then
$R4 + 2(Rd + Rm)$ must equal $R3 + 3Rc$.

The coefficient of $(Rd + Rm)$ equals the number of thermocouples connected through $Rd$ and $Rm$. It will readily be apparent, therefore, how $Rm$ is obtained for any number of thermocouples from the values already known.

The arrangement for balancing two or more groups shown in FIGURE 2 is believed to be preferable in most cases to that of FIGURE 3 since it may be more convenient to load the individual branch circuit such as T5 rather than the bus bar.

In view of the foregoing explanation and illustrations of the application of the principles of the invention, it will be clear how the principles of the invention may be applied to the balancing of thermocouples or other responsive devices in parallel circuits including various numbers of groups or various numbers of devices in the groups. The accuracy of the compensation may be proved mathematically, but such proof is immaterial to an explanation of the invention. The actual computation of the values of the resistors is very simple. The benefits of the invention in accuracy and in physical advantages such as light weight, reliability, economy, and neatness of the installation are highly significant.

Figure 4A:
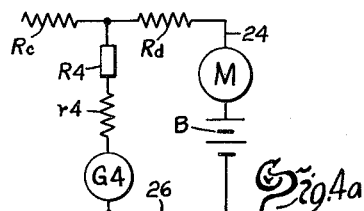
FIGURE 4a is a partial reproduction of FIGURE 4 showing a potential source.

The term "generator" as applied in the claims is not to be considered as limited strictly, since any device which produces a voltage or current may be coupled to others of similar sort, according to the invention, whether the device generates voltage or derives a voltage by modulation or in other fashion. A variable resistor may be the responsive device. If G1, G2, G3, and G4 in FIGURE 4 are variable impedances and the meter M includes a source of potential, as indicated schematically by battery B in FIGURE 4a, the circuit of FIGURE 4 is still balanced and gives correct averages.

Also it should be understood that an individual generator might be replaced by a group of generators in parallel or series so that the term "generator" may be regarded as referring to either an individual or a collective source of current or voltage. As an elementary example of what is meant, it will be apparent that two thermocouples in parallel could be substituted for each individual thermocouple in FIGURES 1, 2, or 3. The computation of the compensating resistors in this case will be apparent from the foregoing description of the invention.

The detailed description herein of improved embodiments of the invention for the purpose of explaining the principles thereof is not to be considered as limiting or restricting the invention, since modifications may be devised by the exercise of skill in the art within the scope of the invention.

I claim:

1. A compensated condition-responsive system comprising, in combination, a plurality of groups of similar condition-responsive generators, a meter, and an individual ladder-type network connecting the generators of each group to the meter, each network comprising two busses and branch circuits connecting to the busses at points distributed along the busses, the generators being connected in the branch circuits, the sections of the busses between adjacent said points having significant impedance and the branch circuits having impedance, characterized by the condition that the quantities which equal the impedance, including the generator therein, of each branch circuit plus the sum of the products of the impedance of each section between the said branch circuit and the meter by the number of generators communicating with the meter through the said section are substantially equal for each branch circuit.

2. A system as recited in claim 1 including an impedance connected in the section immediately adjacent the meter of the bus connecting one group to the meter.

3. A compensated condition-responsive system comprising, in combination, a plurality of similar condition-responsive generators, a meter, and a ladder-type network connecting the generators to the meter, the network comprising a pair of bus bars and a plurality of branch lines, each branch line comprising a generator and leads connecting it to the bus bars, respectively; each branch line having impedance, the several branch lines being connected to each bus bar at points spaced along the bus bar joined by sections of the bus bar having significant impedance; characterized by the condition that the impedance of each branch line except the most remote from the meter substantially equals the impedance of the next more remote branch plus the product of the number of more remote branches multiplied by the impedance of the bus bar section between the said branch line and the next more remote branch line.

4. A compensated condition-responsive system comprising, in combination, a plurality of similar thermocouples, a meter, and a ladder-type network connecting the thermocouples to the meter, the network comprising a pair of bus bars and a plurality of branch lines, each branch line comprising a thermocouple and leads connecting it to the bus bars, respectively; each branch line having resistance, the several branch lines being connected to each bus bar at points spaced along the bus bar joined by sections of the bus bar having significant resistance; characterized by the condition that the resistance of each branch line except the most remote from the meter substantially equals the resistance of the next more remote branch plus the product of the number of more remote branches multiplied by the resistance of the bus bar section between the said branch line and the next more remote branch line.

5. A compensated condition-responsive system comprising, in combination, a plurality of similar condition-responsive generators, a meter, and a ladder-type network connecting the generators to the meter, the network comprising a pair of bus bars and a plurality of branch lines, each branch line comprising a generator and leads connecting it to the bus bars, respectively; each branch line having impedance, the several branch lines being connected to each bus bar at points spaced along the bus bar joined by sections of the bus bar having significant impedance; characterized by the condition that the impedance of each branch line except that most remote from the meter is substantially equal to the sum of the individual products of the impedance of each section of the bus bar more remote from the meter than the said branch line by the number of generators connected to the meter through the said section.

6. A system as recited in claim 5 in which at least one branch line includes an impedance loading device incorporated therein.

7. A compensated condition-responsive system comprising, in combination, a plurality of similar thermocouples, a meter, and a ladder-type network connecting the thermocouples to the meter, the network comprising a pair of bus bars and a plurality of branch lines, each branch line comprising a thermocouple and leads connecting it to the bus bars, respectively; each branch line having resistance, the several branch lines being connected to each bus bar at points spaced along the bus bar joined by sections of the bus bar having significant resistance; characterized by the condition that the resistance of each branch line except that most remote from the meter is substantially equal to the sum of the individual products of the resistance of each section of the bus bar more remote from the meter than the said branch line by the number of thermocouples connected to the meter through the said section.

8. A system as recited in claim 7 in which at least one branch line includes a resistance loading device incorporated therein.

9. A compensated condition-responsive system comprising, in combination, a plurality of similar condition-responsive generators, a meter, and a ladder-type network connecting the generators to the meter, the network comprising a pair of bus bars and a plurality of branch lines, each branch line comprising a generator and leads connecting it to the bus bars, respectively; each branch line having impedance, the several branch lines being connected to each bus bar at points spaced along the bus bar joined by sections of the bus bar having significant impedance; characterized by the condition that the impedances of the branch lines are so chosen that the quantities, each of which is the sum of the impedance of a particular branch line and the several products of the impedance of each bus bar section between the said branch line and the meter by the number of generators connected to the meter through the said bus bar section, are substantially equal for all branch lines.

10. A compensated condition-responsive system comprising, in combination, a plurality of similar thermocouples, a meter, and a ladder-type network connecting the thermocouples to the meter, the network comprising a pair of bus bars and a plurality of branch lines, each branch line comprising a thermocouple and leads connecting it to the bus bars, respectively; each branch line having resistance, the several branch lines being connected to each bus bar at points spaced along the bus bar joined by sections of the bus bar having significant resistance; characterized by the condition that the resistances of the branch lines are so chosen that the quantities, each of which is the sum of the resistance of a particular branch line and the several products of the resistance of each bus bar section between the said branch line and the meter by the number of thermocouples connected to the meter through the said bus bar section, are substantially equal for all branch lines.

11. Means for determining the true arithmetical average of the voltage output of a group of three or more voltage generating means, comprising a pair of common conductors between which said voltage generating means are connected in parallel relation to form a ladder network with one of said voltage generating means disposed in each branch thereof and with the portions of said common conductors between said branches having predetermined appreciable impedance, said ladder network having a pair of output terminals connected to said common conductors across which the average voltage can be measured, the impedance of the branch of said ladder network most remote from said output terminal connections being of predetermined value, and the impedance of each succeeding branch of said ladder network being of value:

$$Rt_n = nR_e$$

where; $Rt_n$ is the impedance of the $n^{th}$ branch where $n$ is counted toward said output terminal connections from said branch most remote therefrom, and $R_e$ is the equivalent impedance of the ladder network including said most remote branch and each succesive branch up to and including the $n^{th}$ branch and the impedance of the portions of said common conductors which connect said branches.

References Cited in the file of this patent

UNITED STATES PATENTS

| 1,659,804 | Brown | Feb. 21, 1928 |
| 1,985,967 | Wunsch | Jan. 1, 1935 |

OTHER REFERENCES

Fast T.C. as Control System Element, Alford, Heising, published in transactions of the ASME, vol. 75, January 1953, pages 10, 11. (Copy in 73–341.)

"The Use of Parallel Thermocouples in Turbojet Engines" by Dahl and Fiock, USAF Techanical Report 6546, pages 1–11, (Wright Air Development Center, Dayton, 1951).

"Average Temperatures by Parallel Connected Thermocouples" by B. D. Drummer. Journal of Applied Physics, vol. 24, No. 2, February 1953, pages 225, 226. (Copy in 73—341.)